United States Patent [19]

Ley

[11] Patent Number: 4,856,580
[45] Date of Patent: Aug. 15, 1989

[54] HEAT EXCHANGER
[75] Inventor: Richard A. Ley, Minneapolis, Minn.
[73] Assignee: Berwind Corporation, Philadelphia, Pa.
[21] Appl. No.: 114,837
[22] Filed: Oct. 30, 1987
[51] Int. Cl.$^4$ ............................................. F28F 5/06
[52] U.S. Cl. ..................................... 165/87; 165/92; 165/86; 416/96 R
[58] Field of Search .............. 165/87, 92, 86; 416/96
[56] References Cited

U.S. PATENT DOCUMENTS

| | | | |
|---|---|---|---|
| 2,610,033 | 9/1952 | Rietz | 165/87 |
| 2,639,898 | 5/1953 | Reich . | |
| 2,761,657 | 9/1956 | Rietz . | |
| 3,263,748 | 8/1966 | Jemal et al. | 165/87 |
| 3,486,740 | 12/1969 | Christian | 165/87 X |
| 4,398,607 | 8/1983 | Reichardt . | |
| 4,429,782 | 2/1984 | Pierson . | |
| 4,596,286 | 6/1986 | Stetler . | |

FOREIGN PATENT DOCUMENTS

| | | |
|---|---|---|
| 4627/72 | 3/1974 | Australia . |
| 0049315 | 4/1982 | European Pat. Off. . |
| 2543519 | 10/1984 | France . |
| 866157 | 4/1961 | United Kingdom . |
| 1308975 | 3/1973 | United Kingdom . |

Primary Examiner—Larry Jones
Attorney, Agent, or Firm—James P. Ryther

[57] ABSTRACT

A conveying screw having a tubular helical flight attached only at its opposite end portions to a hollow conveying screw body. Heat exchange medium introduced into the hollow body is transferred along the tubular helical flight.

13 Claims, 2 Drawing Sheets

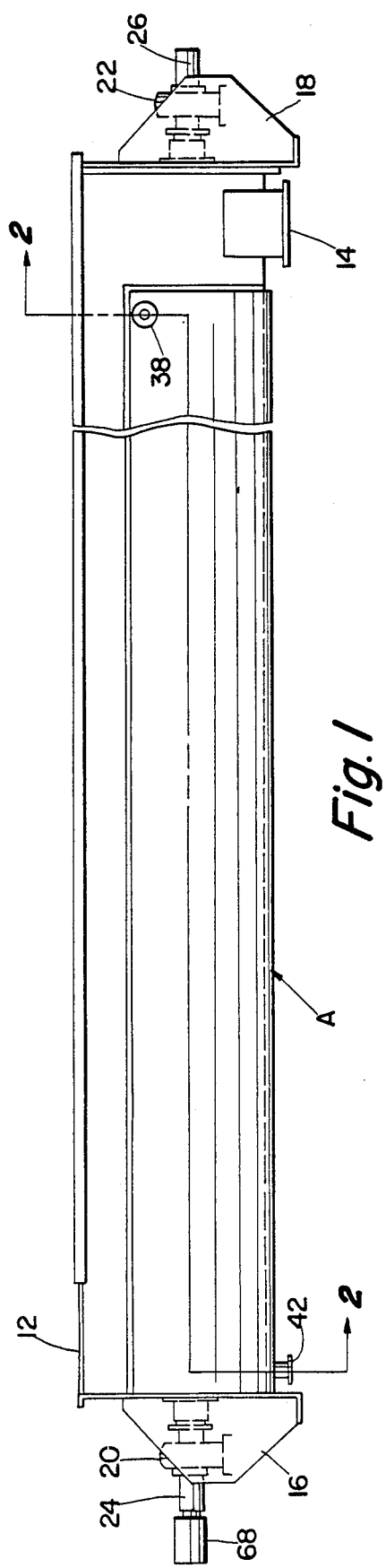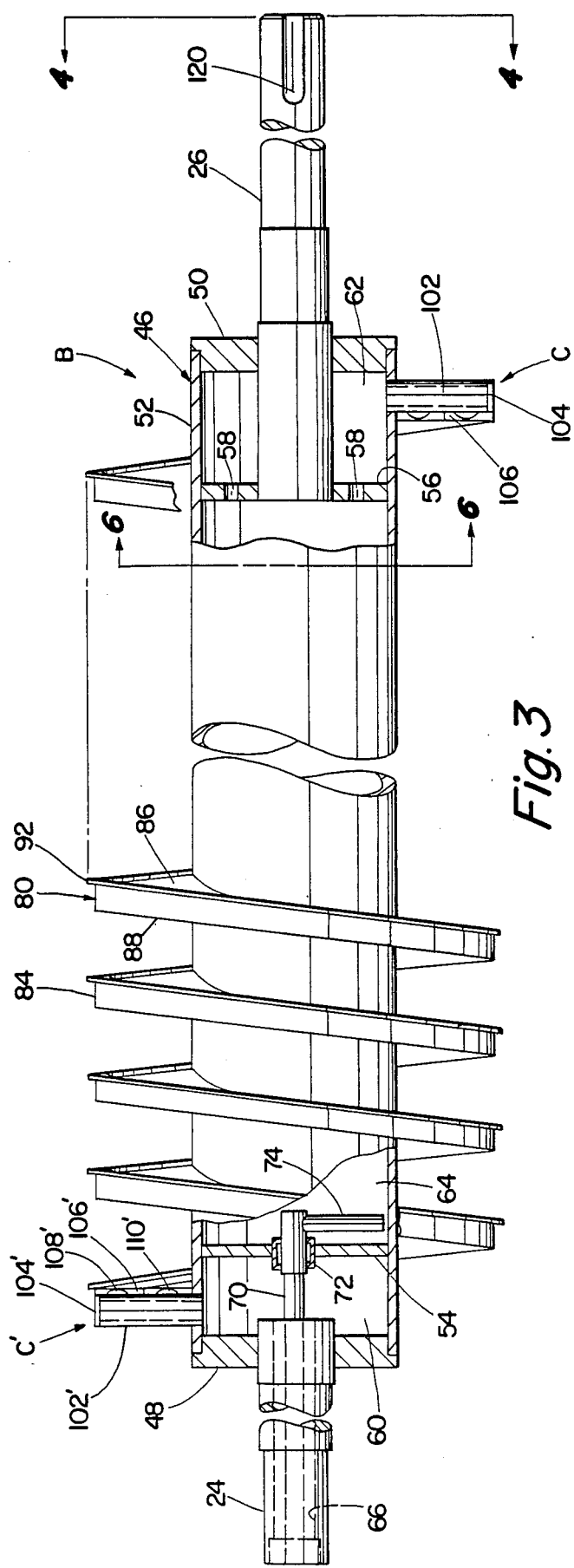

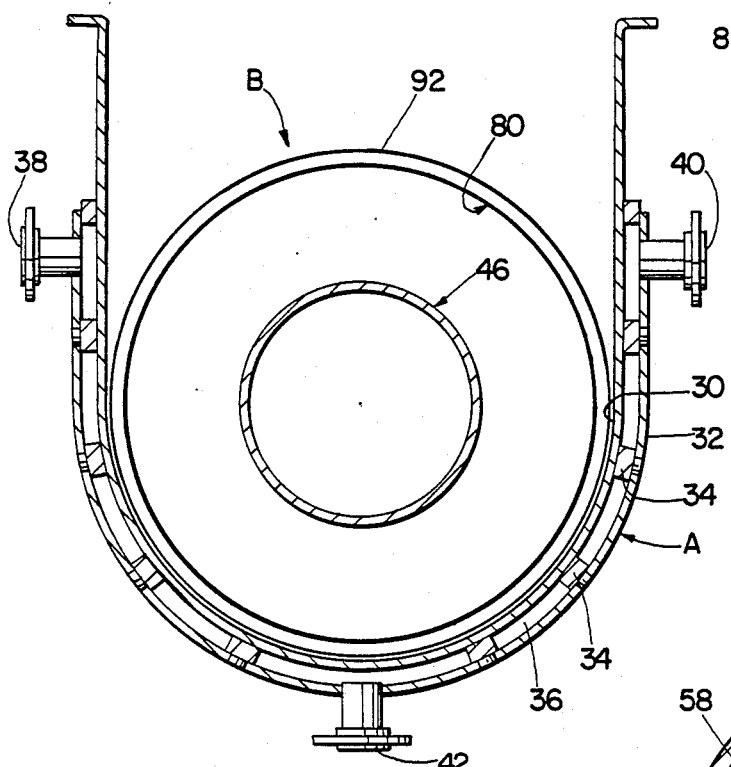
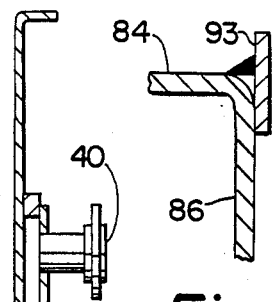
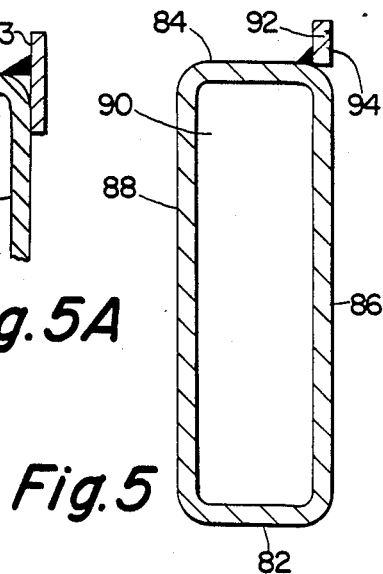
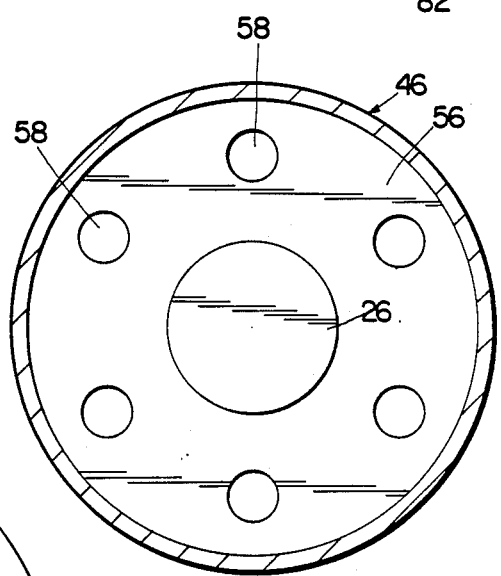
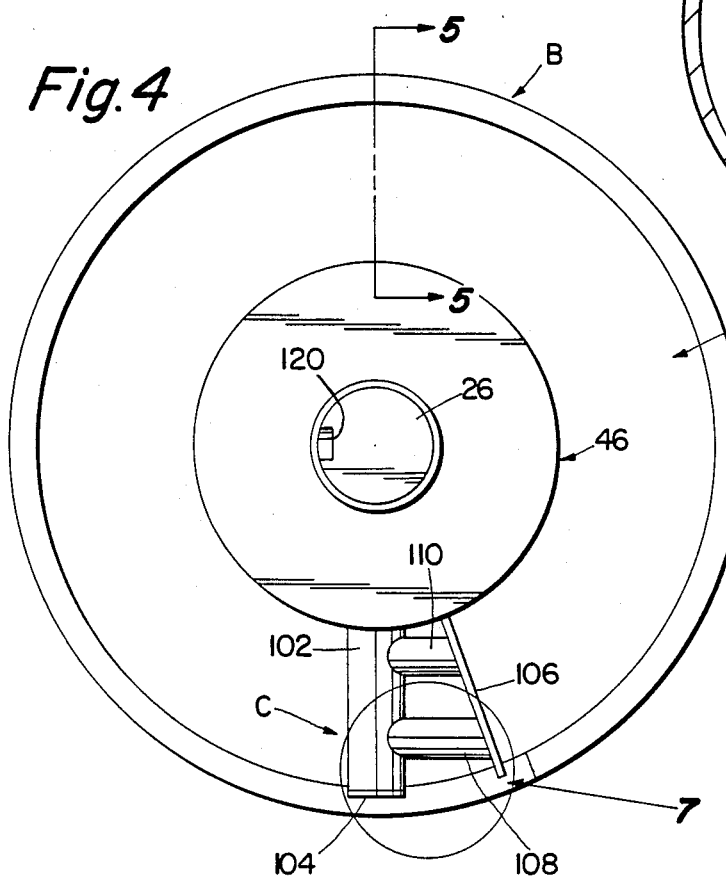
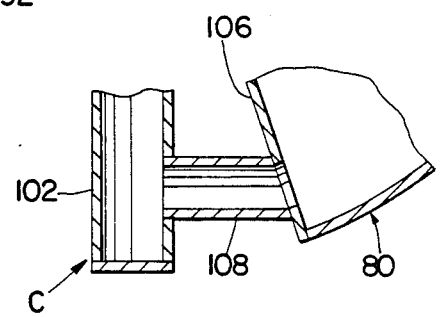

HEAT EXCHANGER

BACKGROUND OF THE INVENTION

This application relates to the art of heat exchangers and, more particularly, to heat exchangers of the type wherein a material is conveyed along a housing in contact with a rotary heat exchanger through which a heat exchange medium passes. The invention is particularly applicable to rotary conveying screw heat exchangers, and will be described with specific reference thereto. However, it will be appreciated that the invention has broader aspects, and certain features may be used in other environments, such as in conveying screws used for conveying materials without exchanging heat.

Rotary conveying screw exchangers are rotatably supported at their opposite end portions, and the central portion of the conveying screw is highly stressed as material is forced to move therealong. Welding a helical flight along the cylindrical body of the conveying screw is very expensive because it is time consuming. In addition, welding along the central portion of the conveying screw body causes stress risers, which are sources of fatigue failure. It would be desirable to have an arrangement for attaching a helical flight to a cylindrical body of a conveying screw without welding along the central portion of the conveying screw body.

SUMMARY OF THE INVENTION

A rotary conveying screw heat exchanger of the type described includes a cylindrical body having opposite body ends, an outer surface and a hollow interior. A helical flight having opposite flight end portions extends along the outer surface of the body, and is attached to the body only at the opposite flight end positions. Where the conveying screw is extremely long, an intermediate attachment point may be provided. However, the helical flight is substantially unattached to the body intermediate the opposite flight end portions. When it is stated that the helical flight is substantially unattached to the body intermediate the opposite flight end portions, it is intended to encompass an arrangement wherein at least one attachment point is provided.

In a preferred arrangement, the helical flight is tubular and communicates with the body hollow interior at the opposite flight end portions. Heat exchange medium introduced into the hollow interior of the body flows through the tubular helical flight for exchanging heat with material being conveyed by the conveying screw.

The tubular helical flight preferably has a rectangular cross-sectional configuration. The tubular helical flight has inner and outer flight surfaces, and leading and trailing faces. A wear bar is attached to the leading face of the flight outer surface.

Connecting tubes may extend outwardly from the outer surface of the body adjacent the opposite body ends. The connecting tubes communicate with the hollow interior and with the tubular helical flight.

It is a principal object of the present invention to provide an improved arrangement for attaching a helical flight to a central body of a conveying screw.

It is also an object of the present invention to provide an improved rotary conveying screw heat exchanger.

It is a further object of the invention to provide a rotary conveying screw heat exchanger which is economical to manufacture, and in which sources of fatigue failure are minimized.

It is an additional object of the invention to provide an improved tubular helical flight having a wear bar attached thereto.

BRIEF DESCRIPTION OF THE DRAWINGS

FIG. 1 is a side elevational view of a housing having the rotary conveying screw heat exchanger of the present application installed therein;

FIG. 2 is a cross-sectional elevational view taken generally on line 2—2 of FIG. 1;

FIG. 3 is a side elevational view of a rotary conveying screw heat exchanger constructed in accordance with the present application;

FIG. 4 is an end elevational view taken generally on line 4—4 of FIG. 3;

FIG. 5 is a partial cross-sectional elevational view taken generally on line 5—5 of FIG. 4;

FIG. 5A is a fragmentary cross-sectional view similar to FIG. 5, showing a wear strip instead of a wear bar;

FIG. 6 is a partial cross-sectional elevational view taken generally on line 6—6 of FIG. 3; and, FIG. 7 is a partial cross-sectional elevational view of the connection indicated by section circle 7 of FIG. 4.

DESCRIPTION OF A PREFERRED EMBODIMENT

Referring now to the drawing, wherein the showings are for purposes of illustrating a preferred embodiment of the invention only, and not for purposes of limiting same, FIG. 1 shows an elongated housing A having an inlet 12 and an outlet 14. Plates 16, 18 at the opposite ends of housing A are provided for mounting bearing supports 20, 22 in which shaft end portions 24, 26 of a rotary conveying screw are rotatably mounted.

As shown in FIG. 2, housing A includes inner and outer walls 30, 32 held in spaced-apart relationship by spacers or embossed dimples 34 to define an interior space 36. Conduits 38, 40 and 42 communicate with space 36. A heat exchange fluid may be directed into space 36 through conduits 38, 40, and discharged therefrom through conduit 42 or vice versa. Material conveyed along housing A between inlet 12 and outlet 14 exchanges heat with the heat transfer fluid passing through housing space 36.

Conveying screw B includes an elongated cylindrical body 46 having closed opposite ends 48, 50, an outer surface 52 and a hollow interior. The hollow interior of cylindrical body 46 is divided into three chambers by a first baffle plate 54 spaced from end 48, and a second baffle plate 56 spaced from end 50. Second baffle plate 56 has a plurality of holes 58 therethrough. An inlet chamber 60 is defined between end 48 and baffle plate 54. An outlet chamber 62 is defined between end 50 and baffle plate 56. A return chamber 64 is defined between baffle plates 54, 56. Return chamber 64 is much longer than chambers 60, 62 and extends along a major portion of the length of body 46.

Conveying screw shaft 24 attached to end 48 has an axial hole 66 therethrough, and is connected with a rotary joint 68 of FIG. 1 through which a heat exchange fluid is supplied to inlet chamber 60. A fluid withdrawal tube 70 having a diameter substantially smaller than the diameter of bore 66 extends axially therethrough and through rotary joint 68. Tube 70 is fixed against rotation and is mounted in a bearing 72 in baffle plate 54 so that conveying screw B may rotate relative thereto. A downwardly extending inlet tube 74 has its inlet end located closely adjacent the inner peripheral surface of cylindrical body 46 for receiving heat exchange fluid from the chamber 64.

If desired, the flow of heat exchange fluid could be reversed, that is, the fluid could be introduced through tubes 70 and 74 and then discharged through chamber 60 and bore 66.

Tubular helical flight 80 extends along outer surface 52 of cylindrical body 46. As shown in FIG. 5, tubular helical flight 80 has inner and outer flight surfaces 82, 84, leading and trailing faces 86, 88, and a hollow interior 90. In the preferred generally rectangular cross-sectional configuration for tubular helical flight 80, inner and outer flight surfaces 82, 84 extend substantially parallel to cylindrical outer surface 52 of body 46. Leading and trailing faces 86, 88 extend transversely of the longitudinal axis of cylindrical body 46. As shown in FIG. 5, leading and trailing faces 86, 88 have a height which is many times the width of surfaces 82, 84. A helical wear bar of generally rectangular cross-sectional shape is welded to flight outer surface 84 as shown in FIG. 5. The wear bar is preferably attached with its leading face 94 substantially aligned in the same plane with flight leading face 86. Alternately, as shown in FIG. 5A, a wear strip 93 can be attached to flight outer surface 84, such that the wear strip overlaps the flight leading face 86 in the vicinity of the flight outer surface 84.

Tubular helical flight 80 has opposite flight end portions attached to cylindrical body 46 in communication with the hollow interior thereof by attachment means C and C' which are located closely adjacent body ends 50, 48. Attachment means C includes a connecting tube 102 welded in a suitable hole through outer surface 52 of body 46 and having a closed outer end 104. The opposite open ends of tubular helical flight 80 have plates 106 welded thereacross. Suitable holes are provided in flight end plates 106, and in connecting tubes 102, for communicating with transfer tubes 108, 110, which are welded to end plates 106 and connecting tubes 102. Attachment means C comprises the sole connection between tubular helical flight 80 and cylindrical body 46. In a situation where the conveying screw is extremely long, it is possible to provide at least one additional connection intermediate the opposite end portions of tubular helical flight 80. For example, a short length of weld may be provided between outer surface 52 of cylindrical body 46 and tubular helical flight 80. This could be necessary where the helical flight is extremely long, and forces acting thereon tend to shift same axially along cylidrical body 46. However, the preferred form is such that attachment means C at the opposite ends of tubular helical flight 80 comprises the sole connection between the helical flight and cylindrical body 46. When it is stated that tubular helical flight 80 is substantially unattached to cylindrical body 46 intermediate the opposite flight end portions, it is meant that at least one additional attachment could be provided.

Tubular helical flight 80 is preferably made from seamless tubing so there are no longitudinal welds. Conveying screw shaft 26 is provided with a keyway 120 for connecting same with a sprocket or the like, rotatably driven by a motor in a known manner. Instead of having holes 58 in baffle plate 56, it will be recognized that it is possible to provide a plurality of circumferentially-spaced notches in the periphery of such plate for passage of heat exchange fluid therethrough.

Tubular helical flight 80 has a large number of turns between its opposite end portions. Although flight 80 is depicted as having a constant pitch, it will be recognized that it is possible to have a varying pitch for enabling compression or expansion of a material as it is conveyed along the conveying screw. The heat exchange fluid circulated through housing A and conveying screw B can be for transferring heat to or from the material conveyed along housing A. Cylindrical body 46 also defines the central portion of the drive shaft for the conveying screw, and is under considerable stress. The absence of welds along the major portion of the length of cylindrical body 46 minimizes fatigue failure. Tubular helical flight 80 is preferably a very close fit on cylindrical body 46. It is possible to make flight 80 slightly shorter than required so it is necessary to stretch same for making connections C, C'. Stretching the flight reduces its inner diameter, and causes its inner surface to tightly grip the outer surface of cylindrical body 46.

In the preferred operation of the device, heat exchange fluid is supplied through rotary joint 68 to bore 66 in shaft 24 and enters inlet chamber 60. The heat exchange fluid flows from inlet chamber 60 through tubes 102', 106', 108' of attachment means C' into tubular helical flight 80. The heat exchange fluid travels along the entire length of tubular helical flight 80 to attachment means C where it enters outlet chamber 62. The heat exchange fluid then travels through holes 58 in baffle plate 56 into return chamber 64 for heating the major length of cylindrical body 46. The heat exchange fluid is then withdrawn from return chamber 64 through tubes 74 and 70. As noted, the flow direction of the heat exchange fluid could be reversed, if desired.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

What is claimed is:

1. A conveying screw for conveying material upon rotation of the screw comprising a generally cylindrical body having an outer surface, a helical flight defining a material engaging surface, said material engaging surface having an inner surface portion positioned closely adjacent said outer surface of said cylindrical body, and said material engaging surface extending outwardly from said inner surface portion whereby material can be conveyed upon screw rotation, said helical flight extending along said outer surface of said body and having opposite flight end portions, and said helical flight being attached to said body at said flight end portions and being substantially unattached to said body intermediate said flight end portions.

2. The conveying screw of claim 1 wherein said helical flight is tubular.

3. The conveying screw of claim 2 wherein said body has a hollow interior and said tubular helical flight is in communication at said end portions thereof with said hollow interior.

4. The conveying screw of claim 2 wherein said tubular helical flight has a substantially rectangular cross-sectional configuration.

5. The conveying screw of claim 2 wherein said tubular helical flight has an inner surface facing said outer surface of said body and an outwardly facing opposite surface, and a wear bar attached to said tubular helical flight along said opposite surface and extending outwardly therefrom.

6. The conveying screw of claim 5 wherein said tubular helical flight has a substantially rectangular cross-sectional shape and leading and trailing faces, said wear bar being attached to said tubular helical flight adjacent said leading face thereof.

7. The conveying screw of claim 2 wherein said body has opposite body ends and a hollow interior, connecting tubes communicating with said hollow interior and extending outwardly from said body outer surface adjacent said body ends, and attachment means for attaching said flight end portions to said connecting tubes in fluid communication therewith.

8. A heat exchanger comprising an elongated housing having an inlet and an outlet, a conveying screw rotatably mounted in said housing for conveying material therealong between said inlet and outlet, said conveying screw including a cylindrical body having opposite ends, a hollow interior and an outer surface, a tubular helical flight extending along said outer surface of said body and having opposite flight end portions, said helical flight defining a material engaging surface, said material engaging surface having an inner surface portion positioned closely adjacent said outer surface of said cylindrical body, and said material engaging surface extending outwardly from said inner surface portion whereby material can be conveyed upon screw rotation, attachment means for attaching said flight end portions to said body in communication with said hollow interior, said tubular helical flight being substantially unattached to said body intermediate said flight end portions, and means for introducing heat exchange medium to said hollow interior for transfer through said tubular helical flight.

9. The heat exchanger of claim 8 wherein said tubular helical flight has a substantially rectangular cross-sectional shape.

10. The heat exchanger of claim 9 wherein said tubular helical flight has inner and outer flight surfaces, and a wear bar attached to said outer flight surface along the length of said conveyng screw.

11. The heat exchanger of claim 10 wherein said tubular helical flight has leading and trailing faces, and said wear bar is attached adjacent said leading face.

12. The heat exchanger of claim 8 wherein said means for introducing heat exchange medium to said hollow interior communicates with said hollow interior through one of said body ends, baffle plate means across said hollow interior spaced from said one body end to define an inlet chamber, and one of said flight end portions communicating with said inlet chamber.

13. The heat exchanger of claim 8 wherein said flight end portions communicate with said hollow interior through said body outer surface adjacent said body end portions.

* * * * *